July 5, 1966
E. D. DALL
3,259,354
SEAT TRACK
Filed Sept. 11, 1964
2 Sheets-Sheet 1
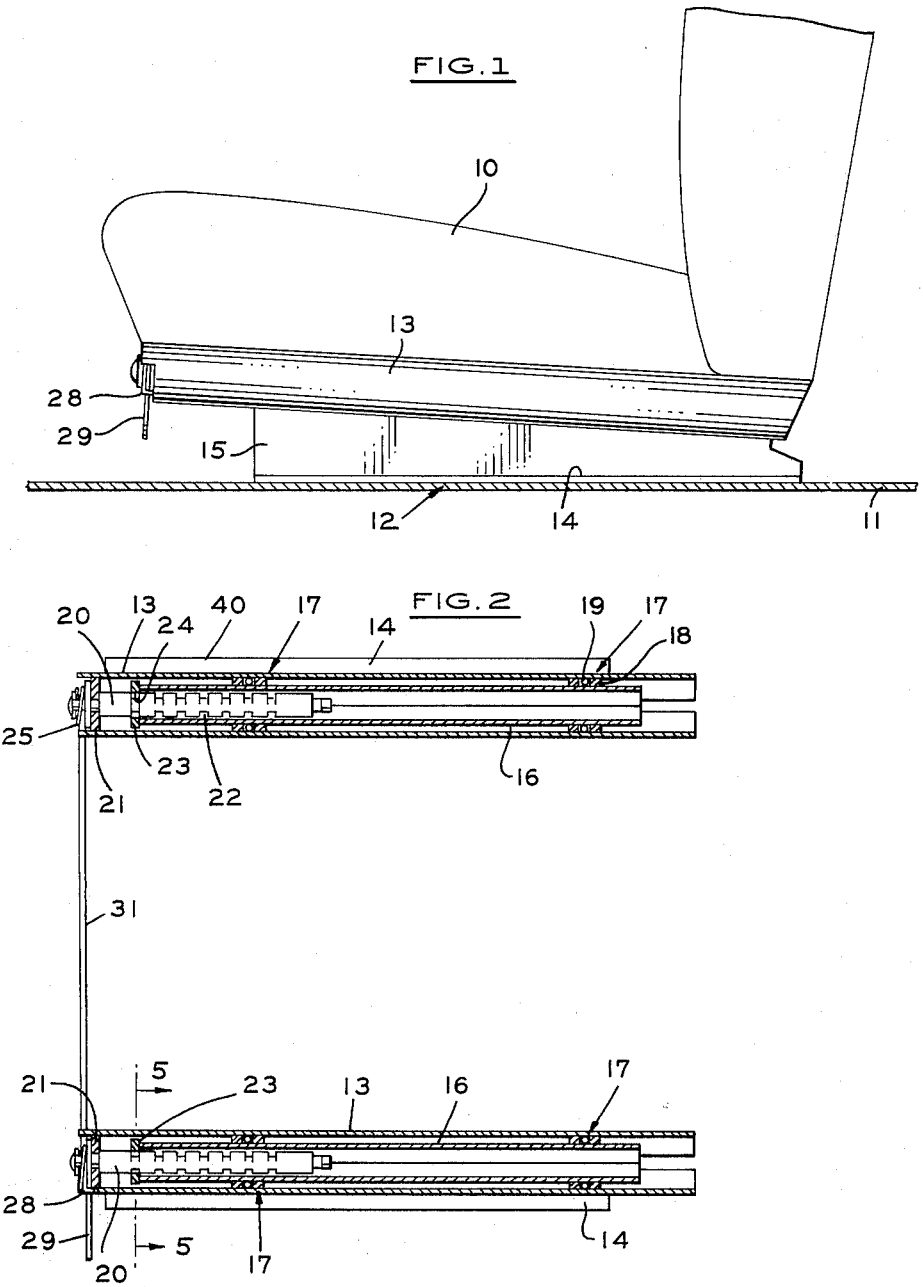
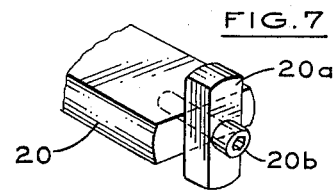
INVENTOR.
EDWARD D. DALL
BY
*Barnes, Kisselle, Raisch & Choate*
ATTORNEYS

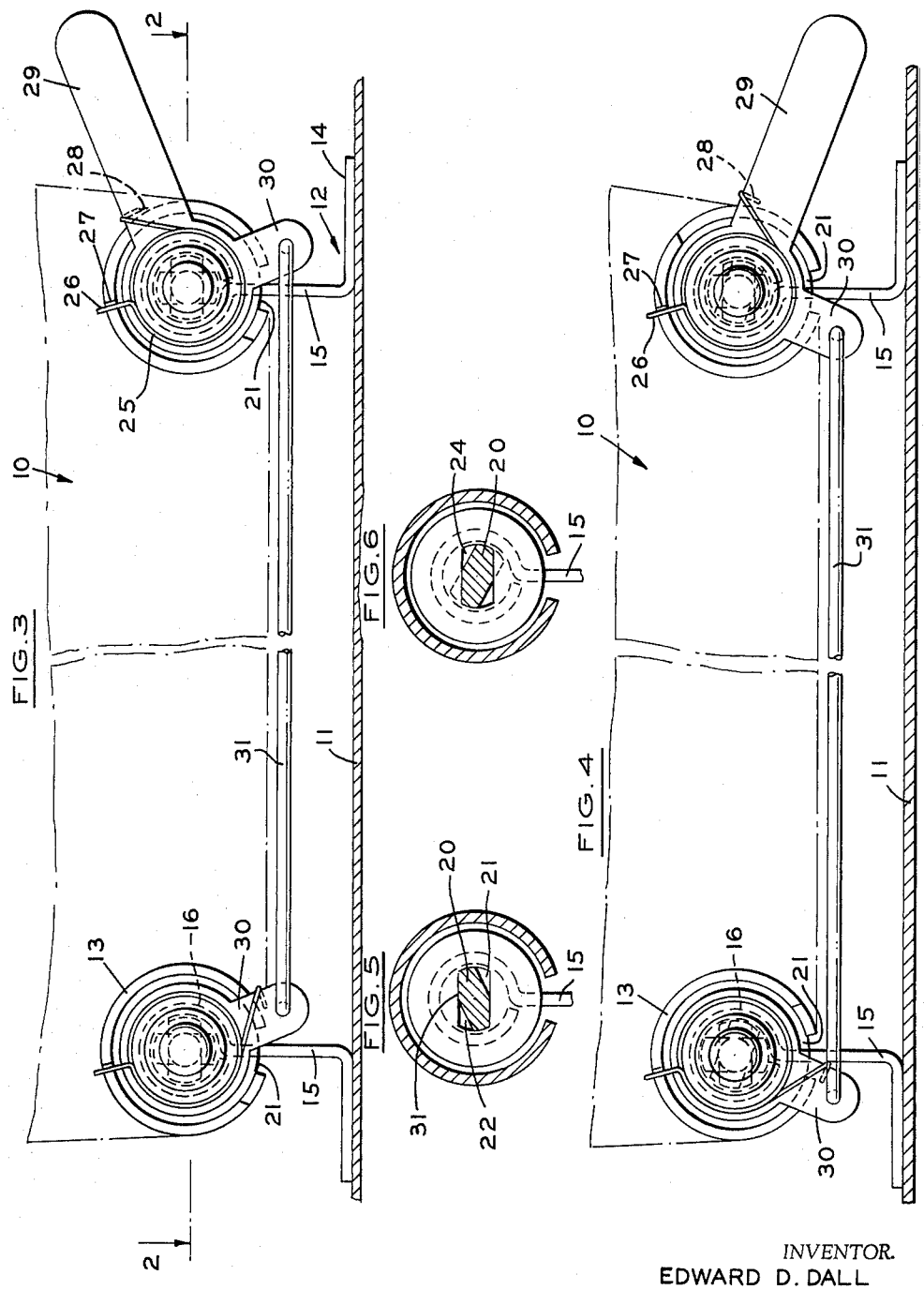

United States Patent Office 3,259,354
Patented July 5, 1966

3,259,354
SEAT TRACK
Edward D. Dall, Birmingham, Mich.; Beatrice L. Dall, administratrix of said Edward D. Dall, deceased
Filed Sept. 11, 1964, Ser. No. 395,697
6 Claims. (Cl. 248—429)

This invention relates to automobile seats and the like and particularly to seat tracks for automobile seats.

It is customary in seat track mechanisms utilized in automobile seats to provide a latching structure for holding the seat carriage in longitudinally adjusted position relative to the support on the floor of the vehicle. Such mechanisms conventionally are positioned exteriorly of the seat track and comprise a sheet metal latch on the support which is selectively movable into one of a plurality of longitudinally spaced notches in a sheet metal web on the carriage.

Such a construction is not only inherently weak because of the lack of strength in flat areas of sheet metal but usually requires substantial vertical distance beneath the seat and therefor interferes with the positioning of the seat as low as possible near the floor of the vehicle. In addition, the mechanism projects laterally outwardly from the seat and thereby interferes with the clothing of the occupant and also makes it difficult to produce a neat appearance on the base of the seat.

It is an object of this invention to provide a seat track which utilizes a novel latching structure that is mounted entirely within the seat track; does not interfere with the positioning of the seat as close as possible to the floor of the vehicle; and which has no laterally projecting portions which would interfere with the passengers or with the appearance of the area of the base of the seat.

Basically, the seat track embodying the invention comprises a carriage on the underside of the seat having a surface complementary to the surface of a support on the floor of a vehicle, bearing means interposed between the complementary surfaces of the carriage and support and an axially extending rod member journalled on the carriage and having longitudinally spaced notches therein which are adapted to selectively engage a lock member on the support. By this construction, when the rod member is rotated about the longitudinal axis of the carriage, the notches are moved out of engagement with the slots and the carriage can then be translated longitudinally to adjust the position of the seat. When the rod member is rotated in the opposite direction, the notches are engaged with the sides of the slots to lock the seat in position.

In the drawings:

FIG. 1 is a side elevational view of a seat embodying the invention.

FIG. 2 is a sectional view taken along the line 2—2 in FIG. 3.

FIG. 3 is a fragmentary front elevational view on an enlarged scale of the seat shown in FIG. 1.

FIG. 4 is a view similar to FIG. 3 showing the parts in latched position.

FIG. 5 is a sectional view on an enlarged scale taken along the line 5—5 in FIG. 2 showing the relative positions of the parts as they are positioned in FIG. 3.

FIG. 6 is a view similar to FIG. 5 showing the relative positions of the parts as they are positioned in FIG. 4.

FIG. 7 is a fragmentary perspective view of a part of the seat latching mechanism.

Referring to FIG. 1, which is a side elevation of the seat embodying the invention, seat 10 is mounted for longitudinal movement relative to the floor 11 of the vehicle by a structure on each side of the seat which includes a support member 12 fixed to the floor 11 and a carriage 13 fixed on the underside of the seat 10 and slidable longitudinally on the support member 12.

As more specifically shown in FIGS. 2–4, support member 12 comprises a base flange 14 and an upstanding web 15 the upper end of which is bent to form a tubular support 16. Carriage 13 is generally tubular and split and preferably forms an integral part of the frame of the seat 10. A plurality of longitudinally spaced bearing assemblies 17 are provided between the surface of the tubular carriage 13 and support 16. Each of the bearing assemblies 17 includes a circular plate member 18 with the ends thereof spaced from one another. Plate member 18 is formed with a slot in which a plurality of tightly wound helical springs 19 are positioned with their axes transverse to the axis of carriage 13 and support portion 16. Such bearing assemblies are more completely shown and described in my Patent 3,007,668, issued November 7, 1961.

In accordance with the invention, a rod member 20 is journalled on a transverse closure member 21 fixed to the front end of each tubular carriage 13 and extends longitudinally of carriage 13. As shown in FIGS. 5 and 6, each rod member 20 is formed with longitudinally spaced diametrically opposed notches 22. The cross section of the rod member 20 is non-circular. A lock plate 23 is provided on the end of the inner tubular support 16 and has a corresponding non-circular opening 24. A helical spring 25 has one end thereof 26 extending outwardly through an opening 27 in tubular carriage 13 and the other end 28 thereof wrapped around a handle 29 in the case of one latch assembly and around a projection 30 (FIG. 3) in the case of the other latch assembly. Projections 30 of opposite seat tracks are connected by a rod 31.

As shown in FIGS. 5 and 6, the cross section of the rod member 20 and slot 24 comprises straight parallel sides connected by opposed curved sides. The base of the notaches 22 extends at an angle to a major bisecting plane parallel to the sides through the cross section and lies entirely on one side of the plane.

In order to prevent the seat carriage from sliding off the support, a locking block 20a, having the same cross section as the rod member 20, is fixed on the end of rod member 20 by a lock screw 20b so that its long axis is at right angles to the long axis of the rod member 20 and slot 24 when the rod member is in unlatched position. In this manner, when the carriage is moved forward, locking block 20a engages locking member 23 to prevent the carriage from sliding off.

In operation, the springs 25 normally urge the rod members clockwise as viewed in FIG. 6 so that the notches 22 engage the sides of the slot 24 in the lock member 23. When it is desired to adjust the position of the seat, the handle 29 is grasped and moved upwardly to the position shown in FIG. 3. This rotates each rod member 20 to the position shown in FIG. 5 so that the seat 10 can then be moved longitudinally relative to the floor of the vehicle. When the handle 29 is released, each spring 25 again rotates its respective rod member 20 to cause the notches 22 to engage the sides of a slot 24 and the lock member 23.

Since the base of the slots 22 lie on one side of a bisecting plane, when the handle 29 is raised to unlatch the rod, the rod can only rotate to the position shown in FIG. 5 and no further so that the rod member is thereby maintained in position for longitudinal movement of the seat relative to the floor of the vehicle by contact of the portions 35 of the rod and slot (FIG. 5).

Since the latching construction is entirely within the seat track, the upstanding web 15 of the support 12 can be made low in height and the seat can therefor be positioned as low as desired with respect to the floor of the vehicle. In addition, since no portion of the latch projects laterally, the sides of the seat track will not interfere with the movements of the occupants of the vehicle and can be readily given a pleasing appearance, for example, by the use of a simple strip 40.

I claim:

1. In a seat track, the combination comprising
   a generally tubular support adapted to be mounted on a floor of a vehicle,
   a generally tubular carriage adapted to be mounted on the underside of the seat and having a surface surrounding a portion of the surface of said support,
   bearing means interposed between said surface and said tubular support at longitudinally spaced points along said carriage,
   a rod member having a plurality of longitudinally spaced notches therein,
   means for journalling said rod member within said tubular carriage for at least limited rotation,
   and a lock member on said inner tubular support extending transversely of said support and having a non-circular slot therein through which said rod member extends,
   the cross sectional shape of said slot being similar to the cross sectional shape of said rod such that when said rod is rotated to move said notches out of engagement with the sides of said slot so that the cross sectional shapes in alignment, said carriage can be moved longitudinally of said support and when said rod member is rotated in the opposite direction, one of said notches engages the sides of the slot in said lock member,
   the base of each said notch being so positioned that said rod member, when moved to bring its cross sectional shape into alignment with the cross sectional shape of the slot, cannot rotate further and thereby the rod member is maintained in alignment with the slot during longitudinal movement of the carriage.

2. In a seat track, the combination comprising
   a generally tubular support adapted to be mounted on a floor of a vehicle,
   a generally tubular carriage adapted to be mounted on the underside of the seat and having a surface surrounding a portion of the surface of said support,
   bearing means interposed between said surface and said tubular support at longitudinally spaced points along said carriage,
   a rod member having a plurality of opposed longitudinally spaced notches therein,
   means for journalling said rod member within said tubular carriage for at least limited rotation,
   and a lock member on said inner tubular support extending transversely of said support and having a non-circular slot therein through which said rod member extends,
   the cross sectional shape of said slot being similar to the cross sectional shape of said rod and having a greater length than width such that when said rod is rotated to move said notches out of engagement with the sides of said slot so that the cross sectional shapes in alignment, said carriage can be moved longitudinally of said support and when said rod member is rotated in the opposite direction, one of said notches engages the sides of the slot in said lock member,
   and spring means yieldingly urging said rod member in a direction to engage one of said notches with said slot,
   the base of each said notch being so positioned that said rod member, when moved to bring its cross sectional shape into alignment with the cross sectional shape of the slot, cannot rotate further and thereby the rod member is maintained in alignment with the slot during longitudinal movement of the carriage.

3. In a seat track, the combination comprising
   a generally tubular support adapted to be mounted on a floor of a vehicle,
   a complementary generally tubular carriage adapted to be mounted on the underside of the seat and having a surface surrounding a portion of the surface of said support,
   bearing means interposed between said surface and said tubular support at longitudinally spaced points along said carriage,
   a rod member having a plurality of longitudinally spaced notches therein,
   means for journalling said rod member within said tubular member for at least limited rotation,
   and a lock member on said inner tubular support extending transversely of said support and having a non-circular slot therein through which said rod member extends,
   the cross sectional shape of said slot being similar to the cross sectional shape of said rod and comprising parallel straight sides connected by curved sides such that when said rod is rotated to move said notches out of engagement with the sides of said slot so that the cross sectional shapes in alignment, said carriage can be moved longitudinally of said support and when said rod member is rotated in the opposite direction, one of said notches engages the sides of the slot in said lock member,
   the base of each said notch being inclined to a major bisecting plane through said rod member so that said rod member, when moved to bring its cross sectional shape into alignment with the cross sectional shape of the slot, cannot rotate further and thereby the rod member is maintained in alignment with the slot during longitudinal movement of the carriage.

4. In a seat track, the combination comprising
   a generally tubular support adapted to be mounted on a floor of a vehicle,
   a complementary generally tubular carriage adapted to be mounted on the underside of the seat and having a surface surrounding a portion of the surface of said support,
   bearing means interposed between said surface and said tubular support at longitudinally spaced points along said carriage,
   a rod member having a plurality of opposed longitudinally spaced notches therein,
   means for journalling said rod member within said tubular member for at least limited rotation,
   and a lock member on said inner tubular support extending transversely of said support and having a non-circular slot therein through which said rod member extends,
   the cross sectional shape of said slot being similar to the cross sectional shape of said rod and comprising parallel straight sides connected by curved sides such that when said rod is rotated to move said notches out of engagement with the sides of said slot so that the cross sectional shapes in alignment, said carriage can be moved longitudinally of said support and when said rod member is rotated in the opposite direction, one of said notches engages the sides of the slot in said lock member,
   the base of each said notch being inclined to a major bisecting plane through said rod member so that said rod member, when moved to bring its cross sectional shape into alignment with the cross sectional shape of the slot, cannot rotate further and thereby the rod member is maintained in alignment with the slot during longitudinal movement of the carriage.

5. The combination set forth in claim 4 including spring means yieldingly urging said rod member in a direction to engage one of said notches with said slot.

6. The combination set forth in claim 4 including a stop on the end of said rod member to prevent said rod member from moving out of said slot.

References Cited by the Examiner

UNITED STATES PATENTS

| | | | |
|---|---|---|---|
| 972,989 | 10/1910 | Bond | 287—58 |
| 3,007,668 | 11/1961 | Dall | 248—429 |

FOREIGN PATENTS 1,248,632 11/1960 France.

CLAUDE A. LE ROY, *Primary Examiner.*

R. P. SEITTER, *Assistant Examiner.*